US007735725B1

(12) United States Patent
Bishop et al.

(10) Patent No.: US 7,735,725 B1
(45) Date of Patent: Jun. 15, 2010

(54) PROCESSING AN RF TRANSACTION USING A ROUTING NUMBER

(76) Inventors: Fred Bishop, 5511 W. Aster, Glendale, AZ (US) 85304; Peter D Saunders, 3710 E. Palisade Dr., Salt Lake City, UT (US) 84109

( * ) Notice: Subject to any disclaimer, the term of this patent is extended or adjusted under 35 U.S.C. 154(b) by 1195 days.

(21) Appl. No.: 11/160,548

(22) Filed: Jun. 28, 2005

Related U.S. Application Data

(63) Continuation-in-part of application No. 10/711,720, filed on Sep. 30, 2004, and a continuation-in-part of application No. 10/708,545, filed on Mar. 10, 2004, said application No. 10/711,720 is a continuation-in-part of application No. 10/340,352, filed on Jan. 10, 2003, said application No. 10/711,720 is a continuation-in-part of application No. 10/192,488, filed on Jul. 9, 2002, now Pat. No. 7,239,226.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*H04B 1/00* (2006.01)

(52) U.S. Cl. .......................... 235/380; 340/5.9

(58) Field of Classification Search ............... 235/380, 235/379; 705/35–45; 340/5.9
See application file for complete search history.

(56) References Cited

U.S. PATENT DOCUMENTS

| 4,558,211 A | 12/1985 | Berstein |
| 4,725,719 A | 2/1988 | Oncken et al. |
| 4,816,653 A | 3/1989 | Anderl et al. |
| 4,868,849 A | 9/1989 | Tamaoki |
| 4,910,521 A | 3/1990 | Mellon |

(Continued)

FOREIGN PATENT DOCUMENTS

| DE | 4339460 | 11/1993 |

(Continued)

OTHER PUBLICATIONS

Financial Technology International Bulletin, V14, n1, p. 4, Sep. 1996.

(Continued)

*Primary Examiner*—Daniel A Hess
(74) *Attorney, Agent, or Firm*—Snell & Wilmer L.L.P.

(57) ABSTRACT

A system and method for securing a Radio Frequency (RF) transaction using a RF identification device transaction device is provided. The invention uses the routing number and customer identifying information associated with a transaction account to secure a RF transaction. Specifically, the customer identifying information is included in an encrypted payload that is provided to a merchant point-of-sale device in a unused field of the RF data transmission. The routing number is provided in the ordinary field location of the data transmission typically reserved for the transaction account number. Additionally, the encrypted payload is provided in the unused field of the data transmission. The routing number is used to locate the corresponding encryption key for validating the RF transaction device, the transaction account and/or customer identifying information without the need for the reader to encrypt the customer identifying information before providing a transaction request to an account issuer.

29 Claims, 7 Drawing Sheets

U.S. PATENT DOCUMENTS

| | | | |
|---|---|---|---|
| 5,068,894 A | 11/1991 | Hoppe | |
| 5,175,416 A | 12/1992 | Mansvelt et al. | |
| 5,193,114 A | 3/1993 | Moseley | |
| 5,288,978 A | 2/1994 | Iijima | |
| 5,365,551 A | 11/1994 | Snodgrass et al. | |
| 5,461,217 A | 10/1995 | Claus | |
| 5,479,494 A | 12/1995 | Clitherow | |
| 5,521,966 A | 5/1996 | Friedes et al. | |
| 5,539,825 A | 7/1996 | Akiyama | |
| 5,541,582 A | 7/1996 | Wagner et al. | |
| 5,544,246 A | 8/1996 | Mandelbaum et al. | |
| 5,559,887 A | 9/1996 | Davis et al. | |
| 5,577,121 A | 11/1996 | Davis et al. | |
| 5,590,197 A | 12/1996 | Chen et al. | |
| 5,602,918 A | 2/1997 | Chen et al. | |
| 5,604,801 A | 2/1997 | Dolan et al. | |
| 5,613,001 A | 3/1997 | Bakhoum | |
| 5,668,876 A | 9/1997 | Falk et al. | |
| 5,694,596 A | 12/1997 | Campbell | |
| 5,705,852 A | 1/1998 | Orihara et al. | |
| 5,715,399 A | 2/1998 | Bezos | |
| 5,727,140 A | 3/1998 | Ohtomo et al. | |
| 5,739,512 A | 4/1998 | Toganazzini | |
| 5,742,756 A | 4/1998 | Dillaway et al. | |
| 5,742,845 A | 4/1998 | Wagner | |
| 5,745,571 A | 4/1998 | Zuk | |
| 5,757,917 A | 5/1998 | Rose et al. | |
| 5,770,843 A | 6/1998 | Rose et al. | |
| 5,778,173 A | 7/1998 | Apte | |
| 5,796,831 A | 8/1998 | Paradinas et al. | |
| 5,799,087 A | 8/1998 | Rosen | |
| 5,806,045 A | 9/1998 | Biorge et al. | |
| 5,815,657 A | 9/1998 | Williams et al. | |
| 5,826,241 A | 10/1998 | Stein et al. | |
| 5,852,812 A | 12/1998 | Reeder | |
| 5,857,079 A | 1/1999 | Claus et al. | |
| 5,859,587 A | 1/1999 | Alicot et al. | |
| 5,883,810 A | 3/1999 | Franklin et al. | |
| 5,884,271 A | 3/1999 | Pitroda | |
| 5,884,292 A | 3/1999 | Baker et al. | |
| 5,884,310 A | 3/1999 | Brichta et al. | |
| 5,889,941 A | 3/1999 | Tushie et al. | |
| 5,892,211 A | 4/1999 | Davis et al. | |
| 5,898,838 A | 4/1999 | Wagner | |
| 5,905,908 A | 5/1999 | Wagner | |
| 5,907,620 A | 5/1999 | Klemba et al. | |
| 5,912,446 A | 6/1999 | Wong et al. | |
| 5,914,472 A | 6/1999 | Foladare et al. | |
| 5,917,925 A | 6/1999 | Moore | |
| 5,920,058 A | 7/1999 | Weber et al. | |
| 5,920,629 A | 7/1999 | Rosen | |
| 5,920,847 A | 7/1999 | Kolling et al. | |
| 5,930,767 A | 7/1999 | Reber et al. | |
| 5,936,226 A | 8/1999 | Aucsmith | |
| 5,945,653 A | 8/1999 | Walker et al. | |
| 5,950,174 A | 9/1999 | Brendzel | |
| 5,950,179 A | 9/1999 | Buchanan et al. | |
| 5,953,710 A | 9/1999 | Fleming | |
| 5,956,693 A | 9/1999 | Geerlings | |
| 5,956,699 A | 9/1999 | Wong et al. | |
| 5,960,416 A | 9/1999 | Block | |
| 5,970,470 A | 10/1999 | Walker | |
| 5,979,757 A | 11/1999 | Tracy et al. | |
| 5,983,200 A | 11/1999 | Slotznick | |
| 6,011,487 A | 1/2000 | Plocher | |
| 6,016,484 A | 1/2000 | Williams et al. | |
| 6,021,943 A | 2/2000 | Chastain | |
| 6,024,286 A | 2/2000 | Bradley et al. | |
| 6,029,175 A | 2/2000 | Chow | |
| 6,041,412 A | 3/2000 | Timson et al. | |
| 6,044,360 A | 3/2000 | Picciallo | |
| 6,060,815 A | 5/2000 | Nysen | |
| 6,061,344 A | 5/2000 | Wood, Jr. | |
| 6,064,751 A | 5/2000 | Smithies et al. | |
| 6,065,675 A | 5/2000 | Teicher | |
| 6,073,112 A | 6/2000 | Geerlings | |
| 6,078,908 A | 6/2000 | Schmitz | |
| 6,088,683 A | 7/2000 | Jalili | |
| 6,088,755 A | 7/2000 | Kobayashi et al. | |
| 6,091,835 A | 7/2000 | Smithies et al. | |
| 6,100,804 A | 8/2000 | Brady et al. | |
| 6,104,281 A | 8/2000 | Heinrich et al. | |
| 6,104,311 A | 8/2000 | Lastinger | |
| 6,115,040 A | 9/2000 | Bladow et al. | |
| 6,173,269 B1 | 1/2001 | Solokl et al. | |
| 6,181,287 B1 | 1/2001 | Beigel | |
| 6,198,762 B1 | 3/2001 | Krasnov | |
| 6,199,079 B1 | 3/2001 | Gupta et al. | |
| 6,199,762 B1 | 3/2001 | Hohle | |
| 6,227,447 B1 | 5/2001 | Campisano | |
| 6,248,199 B1 | 6/2001 | Smulson | |
| 6,263,446 B1 | 7/2001 | Kausik et al. | |
| 6,265,977 B1 | 7/2001 | Vega et al. | |
| 6,267,292 B1 | 7/2001 | Walker et al. | |
| 6,295,522 B1 | 9/2001 | Boesch | |
| 6,327,578 B1 | 12/2001 | Linehan | |
| 6,329,920 B1 | 12/2001 | Morrison et al. | |
| 6,332,134 B1 | 12/2001 | Foster | |
| 6,338,048 B1 | 1/2002 | Mori | |
| 6,378,073 B1 | 4/2002 | Davis et al. | |
| 6,404,341 B1 | 6/2002 | Reid | |
| 6,422,462 B1 | 7/2002 | Cohen | |
| 6,434,159 B1 | 8/2002 | Woodward et al. | |
| 6,438,235 B2 | 8/2002 | Sims, III | |
| 6,445,794 B1 | 9/2002 | Shefi | |
| 6,480,869 B1 | 11/2002 | Fujioka | |
| 6,483,427 B1 | 11/2002 | Werb | |
| 6,483,477 B1 | 11/2002 | Plonka | |
| 6,501,832 B1 | 12/2002 | Saylor et al. | |
| 6,507,662 B1 | 1/2003 | Brooks | |
| 6,520,542 B2 | 2/2003 | Thompson et al. | |
| 6,575,361 B1 | 6/2003 | Graves et al. | |
| 6,587,835 B1 | 7/2003 | Treyz et al. | |
| 6,598,024 B1 | 7/2003 | Walker et al. | |
| 6,608,551 B1 | 8/2003 | Anderson et al. | |
| 6,623,039 B2 | 9/2003 | Thompson et al. | |
| 6,651,168 B1 | 11/2003 | Kao et al. | |
| 6,657,614 B1 | 12/2003 | Ito et al. | |
| 6,671,358 B1 | 12/2003 | Seidman et al. | |
| 6,704,039 B2 | 3/2004 | Pena | |
| 6,704,608 B1 | 3/2004 | Azuma | |
| 6,725,202 B1 | 4/2004 | Hurta et al. | |
| 6,747,546 B1 | 6/2004 | Hikita et al. | |
| 6,749,123 B2 | 6/2004 | Lasch et al. | |
| 6,764,014 B2 | 7/2004 | Lasch et al. | |
| 6,769,718 B1 | 8/2004 | Warther et al. | |
| 6,771,981 B1 | 8/2004 | Zalewski et al. | |
| 6,786,400 B1 | 9/2004 | Bucci | |
| 6,839,840 B1 * | 1/2005 | Cooreman | 713/172 |
| 6,851,617 B2 | 2/2005 | Saint et al. | |
| 6,853,087 B2 | 2/2005 | Neuhaus et al. | |
| 6,873,974 B1 | 3/2005 | Schutzer | |
| 6,883,715 B1 | 4/2005 | Fruhauf et al. | |
| 6,915,277 B1 | 7/2005 | Manchester et al. | |
| 6,940,461 B2 | 9/2005 | Nantz et al. | |
| 6,959,874 B2 | 11/2005 | Bardwell | |
| 6,961,448 B2 | 11/2005 | Nichols et al. | |
| 6,970,583 B2 | 11/2005 | Black | |
| 6,978,369 B2 | 12/2005 | Wheeler et al. | |
| 6,994,262 B1 | 2/2006 | Warther | |
| 7,003,497 B2 | 2/2006 | Maes | |
| 7,006,993 B1 | 2/2006 | Cheong et al. | |
| 7,049,962 B2 | 5/2006 | Atherton et al. | |
| 7,051,925 B2 | 5/2006 | Schwarz, Jr. | |

| | | |
|---|---|---|
| 7,059,159 B2 | 6/2006 | Lanigan et al. |
| 7,068,148 B2 | 6/2006 | Shanks et al. |
| 7,070,112 B2 | 7/2006 | Beenau et al. |
| 7,096,494 B1 | 8/2006 | Chen |
| 7,102,523 B2 | 9/2006 | Shanks et al. |
| 7,103,575 B1 | 9/2006 | Linehan |
| 7,108,190 B2 | 9/2006 | Burgan et al. |
| 7,119,659 B2 | 10/2006 | Bonalle et al. |
| 7,131,574 B1 | 11/2006 | Sciupac et al. |
| 7,132,946 B2 | 11/2006 | Waldner et al. |
| 7,136,835 B1 | 11/2006 | Flitcroft et al. |
| 7,154,375 B2 | 12/2006 | Beenau et al. |
| 7,171,662 B1 | 1/2007 | Misara et al. |
| 7,172,112 B2 | 2/2007 | Bonalle et al. |
| 7,184,747 B2 | 2/2007 | Bogat |
| 7,239,226 B2 | 7/2007 | Berardi et al. |
| 7,281,135 B2 | 10/2007 | Black |
| 7,287,271 B1 | 10/2007 | Riggins |
| 7,287,695 B2 | 10/2007 | Wankmueller |
| 7,299,364 B2 | 11/2007 | Noble et al. |
| 7,303,120 B2 | 12/2007 | Beenau et al. |
| 7,314,164 B2 | 1/2008 | Bonalle et al. |
| 7,314,165 B2 | 1/2008 | Bonalle et al. |
| 7,318,550 B2 | 1/2008 | Bonalle et al. |
| 7,325,724 B2 | 2/2008 | Bonalle et al. |
| 7,341,181 B2 | 3/2008 | Bonalle et al. |
| 7,363,504 B2 | 4/2008 | Bonalle et al. |
| 7,363,505 B2 | 4/2008 | Black |
| 7,419,093 B1 | 9/2008 | Blackson, et al. |
| 2001/0032192 A1 | 10/2001 | Putta et al. |
| 2001/0040507 A1 | 11/2001 | Eckstein et al. |
| 2001/0055411 A1 | 12/2001 | Black |
| 2002/0005774 A1 | 1/2002 | Rudolph et al. |
| 2002/0024590 A1 | 2/2002 | Pena |
| 2002/0026419 A1 | 2/2002 | Maritzen et al. |
| 2002/0030579 A1 * | 3/2002 | Albert et al. ................ 340/5.9 |
| 2002/0036237 A1 | 3/2002 | Atherton et al. |
| 2002/0038818 A1 | 4/2002 | Zingher et al. |
| 2002/0062284 A1 | 5/2002 | Kawan |
| 2002/0095587 A1 | 7/2002 | Doyle |
| 2002/0107791 A1 | 8/2002 | Nobrega et al. |
| 2002/0111919 A1 | 8/2002 | Weller et al. |
| 2002/0112177 A1 | 8/2002 | Voltmer et al. |
| 2002/0138425 A1 | 9/2002 | Shimizu et al. |
| 2002/0139839 A1 | 10/2002 | Catan |
| 2002/0140542 A1 | 10/2002 | Prokoski et al. |
| 2002/0147002 A1 | 10/2002 | Trop et al. |
| 2002/0152123 A1 | 10/2002 | Giordano et al. |
| 2002/0158747 A1 | 10/2002 | McGregor et al. |
| 2002/0165931 A1 | 11/2002 | Greer et al. |
| 2002/0175805 A9 | 11/2002 | Armstrong et al. |
| 2002/0178063 A1 | 11/2002 | Gravelle et al. |
| 2002/0178369 A1 | 11/2002 | Black |
| 2002/0179704 A1 | 12/2002 | Deaton |
| 2002/0186838 A1 | 12/2002 | Brandys |
| 2002/0188854 A1 | 12/2002 | Heaven et al. |
| 2003/0005310 A1 | 1/2003 | Shinzaki |
| 2003/0006901 A1 | 1/2003 | Kim et al. |
| 2003/0009382 A1 | 1/2003 | DArbeloff et al. |
| 2003/0018893 A1 | 1/2003 | Hess |
| 2003/0055727 A1 | 3/2003 | Walker et al. |
| 2003/0097344 A1 | 5/2003 | Chaum et al. |
| 2003/0115126 A1 | 6/2003 | Pitroda |
| 2003/0130820 A1 | 7/2003 | Lane, III |
| 2003/0149662 A1 | 8/2003 | Shore |
| 2003/0195037 A1 | 10/2003 | Vuong et al. |
| 2004/0019564 A1 | 1/2004 | Goldthwaite et al. |
| 2004/0030601 A1 | 2/2004 | Pond et al. |
| 2004/0031856 A1 | 2/2004 | Atsmon et al. |
| 2004/0039814 A1 | 2/2004 | Crabtree et al. |
| 2004/0044627 A1 | 3/2004 | Russell et al. |
| 2004/0073792 A1 | 4/2004 | Noble et al. |
| 2004/0160310 A1 | 8/2004 | Chen et al. |
| 2004/0169071 A1 | 9/2004 | Burgan et al. |
| 2004/0193676 A1 | 9/2004 | Marks |
| 2004/0236700 A1 | 11/2004 | Beenau et al. |
| 2005/0017068 A1 | 1/2005 | Zalewski et al. |
| 2005/0033689 A1 | 2/2005 | Bonalle et al. |
| 2005/0035192 A1 | 2/2005 | Bonalle et al. |
| 2005/0040221 A1 | 2/2005 | Schwarz, Jr. |
| 2005/0122209 A1 | 6/2005 | Black |
| 2005/0123137 A1 | 6/2005 | McCallum |
| 2005/0125312 A1 | 6/2005 | Dearing et al. |
| 2005/0144133 A1 | 6/2005 | Hoffman et al. |
| 2005/0149358 A1 | 7/2005 | Sacco et al. |
| 2005/0187916 A1 | 8/2005 | Levin et al. |
| 2005/0203857 A1 | 9/2005 | Friedman |
| 2005/0207002 A1 | 9/2005 | Liu et al. |
| 2005/0216424 A1 | 9/2005 | Gandre et al. |
| 2005/0246292 A1 | 11/2005 | Sarcanin |
| 2006/0000892 A1 | 1/2006 | Bonalle et al. |
| 2006/0000893 A1 | 1/2006 | Bonalle et al. |
| 2006/0000894 A1 | 1/2006 | Bonalle et al. |
| 2006/0000895 A1 | 1/2006 | Bonalle et al. |
| 2006/0000896 A1 | 1/2006 | Bonalle et al. |
| 2006/0000897 A1 | 1/2006 | Bonalle et al. |
| 2006/0000898 A1 | 1/2006 | Bonalle et al. |
| 2006/0000899 A1 | 1/2006 | Bonalle et al. |
| 2006/0016868 A1 | 1/2006 | Bonalle et al. |
| 2006/0016869 A1 | 1/2006 | Bonalle et al. |
| 2006/0016871 A1 | 1/2006 | Bonalle et al. |
| 2006/0016874 A1 | 1/2006 | Bonalle et al. |
| 2006/0016875 A1 | 1/2006 | Bonalle et al. |
| 2006/0016877 A1 | 1/2006 | Bonalle et al. |
| 2006/0033609 A1 | 2/2006 | Bridgelall |
| 2006/0066444 A1 | 3/2006 | Steeves |
| 2006/0071756 A1 | 4/2006 | Steeves |
| 2006/0095369 A1 | 5/2006 | Hofi |
| 2006/0123240 A1 | 6/2006 | Chaiken |
| 2006/0156395 A1 | 7/2006 | Fontaine |
| 2006/0178937 A1 | 8/2006 | Rau et al. |
| 2006/0202835 A1 | 9/2006 | Thibault |
| 2006/0208066 A1 | 9/2006 | Finn et al. |
| 2006/0213986 A1 | 9/2006 | Register et al. |
| 2006/0229988 A1 | 10/2006 | Oshima et al. |
| 2006/0237528 A1 | 10/2006 | Bishop et al. |
| 2006/0242423 A1 | 10/2006 | Kussmaul |
| 2006/0278723 A1 | 12/2006 | Dan et al. |
| 2007/0008131 A1 | 1/2007 | Doan et al. |
| 2007/0046468 A1 | 3/2007 | Davis |
| 2007/0057797 A1 | 3/2007 | Waldner et al. |
| 2007/0075841 A1 | 4/2007 | Maltsev et al. |
| 2007/0112957 A1 | 5/2007 | Shastri et al. |
| 2007/0119924 A1 | 5/2007 | Register et al. |
| 2007/0252010 A1 | 11/2007 | Gonzalez et al. |
| 2007/0296544 A1 | 12/2007 | Beenau et al. |
| 2007/0296551 A1 | 12/2007 | Beenau et al. |
| 2007/0299782 A1 | 12/2007 | Beenau et al. |
| 2007/0299783 A1 | 12/2007 | Beenau et al. |
| 2008/0006691 A1 | 1/2008 | Bonalle et al. |
| 2008/0008363 A1 | 1/2008 | Bonalle et al. |
| 2008/0010214 A1 | 1/2008 | Bonalle et al. |
| 2008/0011830 A1 | 1/2008 | Bonalle et al. |
| 2008/0011831 A1 | 1/2008 | Bonalle et al. |
| 2008/0013796 A1 | 1/2008 | Bonalle et al. |
| 2008/0013807 A1 | 1/2008 | Bonalle et al. |
| 2008/0015941 A1 | 1/2008 | Beenau et al. |
| 2008/0015992 A1 | 1/2008 | Bonalle et al. |
| 2008/0015993 A1 | 1/2008 | Bonalle et al. |
| 2008/0015994 A1 | 1/2008 | Bonalle et al. |
| 2008/0016002 A1 | 1/2008 | Beenau et al. |
| 2008/0033722 A1 | 2/2008 | Beenau et al. |
| 2008/0067242 A1 | 3/2008 | Bonalle et al. |

| | | | |
|---|---|---|---|
| 2008/0072065 | A1 | 3/2008 | Bonalle et al. |

FOREIGN PATENT DOCUMENTS

| | | |
|---|---|---|
| EP | 0917120 | 5/1999 |
| EP | 0927945 | 7/1999 |
| EP | 0949595 | 10/1999 |
| EP | 1017030 | 7/2000 |
| EP | 1345146 | 9/2003 |
| GB | 2350021 | 11/2000 |
| JP | 42-005596 | 7/1992 |
| JP | 09-050505 | 2/1997 |
| JP | 10-289296 | 10/1998 |
| JP | 10-334206 | 12/1998 |
| JP | 10-340231 | 12/1998 |
| JP | 11-175640 | 7/1999 |
| JP | 11-353425 | 12/1999 |
| JP | 2000-048153 | 2/2000 |
| JP | 2000-163538 | 6/2000 |
| JP | 2000-194799 | 7/2000 |
| JP | 2000-222176 | 8/2000 |
| JP | 2000-252854 | 9/2000 |
| JP | 2001-134536 | 5/2001 |
| JP | 2001-160105 | 6/2001 |
| JP | 2002-109584 | 4/2002 |
| JP | 2002-133335 | 5/2002 |
| JP | 2002-157530 | 5/2002 |
| JP | 2003-288646 | 10/2003 |
| WO | WO 95/35546 | 12/1995 |
| WO | WO 97/40459 | 10/1997 |
| WO | WO 98/21683 | 5/1998 |
| WO | WO 98/45778 | 10/1998 |
| WO | WO 99/21321 | 4/1999 |
| WO | WO 99/40548 | 8/1999 |
| WO | WO 03/007623 | 1/2003 |

OTHER PUBLICATIONS

Green, Thomas C., "American Express Offers temporary CC numbers for the web," Sep. 9, 2000, The Register, www.theregister.c.uk/c.

CNN.com, U.S. News, "American Express to offer disposable credit card numbers," Sep. 8, 2000, Associated Press, www.cnn.c.

American Express, "Private Payments (SM) ; A New Level of Security from American Express," American Express Website, Cards, Aug. 22, 2001.

Martin, Zack, "One-Time Numbers Stop Web Hackers From Pilfering Data," Jan. 2001, Card Marketing, Thomson Financial, www.crdfrum.c.

The Dollar Stretcher, "Disposable Credit Card Numbers," Jan. 2001, CardRatings.org, www.stretcher.c.

ISO/IEC 7816-6:1996(E)—First Edition—May 15, 1996.

ISO/IEC 7816-4:1995(E)—First Edition—Sep. 1, 1995.

Goldman, J., "Internet Security, The Next Generation, When Software Encryption is not Enough," Web Techniques, Nov. 1997, pp. 43-46.

Simmons, J., "Smart Cards Hold the Key to Secure Internet Commerce," EC World, Dec. 1998, pp. 36-38.

Wayner, P., "Digital Cash," AP Professional, 1996, pp. 76-83, 85-100.

"ISO Standards," available from http://www.iso.ch/projects/loading.html, Oct. 18, 2000.

Turban, et al., "Using Smartcards in Electronic Commerce," Proc. 31st Annual Hawaii Inter. Conf. on System Sciences, vol. 4, 1998, pp. 62-69.

Dhem, et al., "SCALPS: Smart Card for Limited Payment Systems," IEEE Micro, Jun. 1996, pp. 42-51.

Smith, M.T., "Smart Cards: Integrating for Portable Complexity," Computer-Integrated Engineering, Aug. 1998, pp. 110-115.

PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.

Geer, et al., "Token-Mediated Certification and Electronic Commerce," Proc. 2nd USENIX Workshop on Electronic Commerce, Nov. 18-21, 1996, pp. 13-22.

Gobioff, et al., "Smart Cards in Hostile Environments," Proc. 2nd USENIX Workshop in Electronic Commerce, Nov. 18-21, 1996, pp. 23-28.

Fancher, C.H., "In Your Pocket Smartcards," IEEE Spectrum, Feb. 1997, pp. 47-53.

Blythe, I., "Smarter, More Secure Smartcards," BYTE, Jun. 1997, pp. 63-64.

Leach, Dr. J., "Dynamic Authentication for Smartcards," Computers and Security, vol. 14, No. 5, 1995, pp. 385-389.

Wu, et al., "Authenticating Passwords Over an Insecure Channel," Computers and Security, vol. 15, No. 5, 1996, pp. 431-439.

Manninger, et al., "Adapting an Electronic Purse for Internet Payments," ACISP '98 Proceedings, Jul. 13-15, 1998, pp. 205-214.

Yan, et al., "Banking on the Internet and Its Applications," Proc. 13th Annual Hawaii International Conference on System Sciences, vol. 4, 1997, pp. 275-284.

Transport Layer Security Working Group, "The SSL Protocol, Version 3.0," Nov. 18, 1996 (also available at http://home.netscape.com/eng/ssl3/draft302.txt).

Business Wire (press release), "Master Card E-Wallet," Jul. 11, 2000.

Obongo.com Website, "Obongo," Aug. 8, 2000 (Description of wallet toolbar also available at http://www.obongo.com/chabi/website/index.htm).

\* cited by examiner

PROCESSING AN RF TRANSACTION USING A ROUTING NUMBER

CROSS-REFERENCE TO RELATED APPLICATIONS

This invention ('548 application) is a Continuation-in-Part of U.S. patent application Ser. No. 10/711,720, entitled "SYSTEMS AND METHODS FOR MANAGING MULTIPLE ACCOUNTS ON A RF TRANSACTION DEVICE USING SECONDARY IDENTIFICATION INDICIA," filed Sep. 30, 2004. The '548 application is also a continuation-in-part of U.S. patent application Ser. No. 10/708,545, titled "SYSTEM AND METHOD FOR SECURING RF TRANSACTIONS USING A RADIO FREQUENCY IDENTIFICATION DEVICE INCLUDING A TRANSACTION COUNTER," filed Mar. 10, 2004. Both the '720 and '545 applications are non-provisional's of U.S. Provisional Application No. 60/507,803, filed Sep. 30, 2003. The '548 application is also a continuation-in-part of U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003. The '352 application is a non-provisional of U.S. Provisional Patent Application No. 60/396,577, filed Jul. 16, 2002. The '548 application is also a continuation-in-part of U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002, and has now issued as U.S. Pat. No. 7,239,226 on Jul. 3, 2007. The '488 is a non-provisional of U.S. Provisional Patent Application No. 60/304,216, filed Jul. 10, 2001. All of the above-listed applications are incorporated herein by reference.

FIELD OF INVENTION

This invention generally relates to a system and method for securing a Radio Frequency (RF) transaction using a RF operable transaction device, and more particularly, to securing a RF transaction using a Radio Frequency Identification (RFID) device module including a transactions counter.

BACKGROUND OF INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in portable devices identifiable by hand. For example, RFID modules are being placed in a fob or tag for use in completing financial transactions. A typical fob includes a RF transponder and is typically a self-contained device which may be contained on any portable form factor. In some instances, a battery may be included with the fob to power the transponder, in which case the internal circuitry of the fob (including the transponder) may draw its operating power from the battery power source. Alternatively, the fob may exist independent of an internal power source. In this instance the internal circuitry of the fob (including the transponder) may gain its operating power directly from a RF interrogation signal provided by a RF reader. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. These are called "passive" RFID devices. Alternatively, the fob may have an internal power source such that interrogation by the reader to activate the fob is not required. These RFID devices are termed "active" RFID devices.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point-of-Sale (POS) device. Fob identification data is typically passed to a third-party server database, where the identification data is referenced to a customer (e.g., user) credit or debit account. In an exemplary processing method, the server seeks authorization for the transaction by passing the transaction and account data to an authorizing entity, such as for example an "acquirer" or account issuer. Once the server receives authorization from the authorizing entity, the authorizing entity sends clearance to the point-of-sale device for completion of the transaction.

Minimizing fraud transactions in the RFID environment is typically important to the account issuer to lessen the loss associated with fraudulent RFID transaction device usage. One conventional method for securing RFID transactions involves requiring the device user to provide a secondary form of identification during transaction completion. For example, the RFID transaction device user may be asked to enter a personal identification number (PIN) into a keypad. The PIN may then be verified against a number associated with the user or the RFID transaction device, where the associated number is stored in an account issuer database. If the PIN number provided by the device user matches the associated number, then the transaction may be cleared for completion.

One problem with the conventional method of securing an RFID transaction is that the time for completing the transaction is increased. This is true since the RFID device user must delay the transaction to provide the alternate identification. The increased time for completing a transaction defeats one real advantage of the RFID transaction device, which is to permit expedient completion of a transaction since the account information may be passed to a reader without merchant involvement.

Another problem associated with conventional securing methods is that the customer identifying information (e.g., customer name, address, customer demographics, etc.) is susceptible to theft when transmitted from the RFID device to the RFID reader. Merchants often print the customer identifying information on a receipt for billing purposes. Alternatively, merchants store the customer identifying information for recordkeeping purposes, such as if the customer identifying information is needed to settle a transaction dispute. Typically, the merchant receives the customer identifying information from the RFID reader which receives the information from the RFID device as unencrypted data ("in-the-clear data"). The unencrypted data therefore may be intercepted by unscrupulous eavesdroppers bent on using the customer's identifying information for fraudulent purposes.

As such, a need exists for a method of securing a RFID transaction which does not increase the time needed to complete the transaction, and which method may be used without device user intervention. A further need exists for a system that secures customer identifying information transmitted in-the-clear.

SUMMARY OF INVENTION

Described herein is a system and method for securing RFID transactions which addresses the problems found in conventional transaction securing methods. The securing method described includes verifying a RFID transaction device counter, which may generate an indicia corresponding to the number of transactions conducted using a particular RFID transaction device. The method involves variously validating a RFID device authentication tag and a RFID reader authentication tag. The method further involves placing the routing number associated with a transaction account in the transmission data field typically reserved for the transaction account number, and placing encrypted card information (e.g., card number and/or expiration date) in an alternate unused field of a transaction request. One implementation will be to use the unused 16 characters at positions 64-79 of the Track 1 format as defined in ISO7813. The encrypted card information is decrypted at the issuer location using a decryption key correlated to the routing number transmitted in the transaction account number field.

In one exemplary embodiment, the invention discloses a system and method for verifying a RFID transaction device and RFID reader operable with a RF transaction system. The method involves presenting a RFID transaction system to a RFID reader, receiving a random number from the RFID reader, creating a RFID transaction device authentication tag using the random number and a counter value, providing the random number, counter value, and RFID transaction device authentication tag to a RFID reader, creating a RFID reader authentication tag using the counter random number, and/or RFID transaction device authentication tag, and providing the RFID reader and RFID transaction device for authentication.

Under a second embodiment, the invention involves verifying the RFID transaction device only. Still under another embodiment, the invention involves verifying the RFID reader without verifying the RFID transaction device.

In yet another embodiment of the invention, the method involves using the data transmission fields to secure a RF transmission. In general, the invention includes placing the routing number in the data transmission field typically reserved for the transaction account number, and forwarding the routing number and an encrypted transaction account number and expiration date to the RFID reader. The RFID reader then places the encrypted account number and expiration date in the data transmission field typically reserved for unused data, such as, for example, positions 64-79 of the 7813 Track 1 format, and forwards the data transmission to the merchant system. The merchant system receives the data transmission and forwards a transaction request to the transaction account issuer for transaction settlement. The account issuer may receive the transaction request and locate a transaction account decryption key useful for decrypting the information stored in the unused field, decrypt the transaction account information, and process the transaction request under issuer-defined business as usual standards.

In still another embodiment, the method involves using the data transmission fields to secure a RF transmission by placing the routing number in the data transmission field typically reserved for the transaction account number, and forwarding the routing number and an encrypted transaction account number, expiration date and customer identifying information to the RFID reader. The RFID reader then places the encrypted account number, expiration date, and customer identifying information in the data transmission field typically reserved for unused data and forwards the data transmission to the merchant system. The merchant system receives the data transmission and forwards a transaction request to the transaction account issuer for transaction settlement. The account issuer may receive the transaction request and locate a transaction account decryption key useful for decrypting the information stored in the unused field, decrypt the transaction account information, and process the transaction request under issuer-defined business as usual standards. The issuer may then forward the decrypted customer information to the merchant system for use in billing or record keeping.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
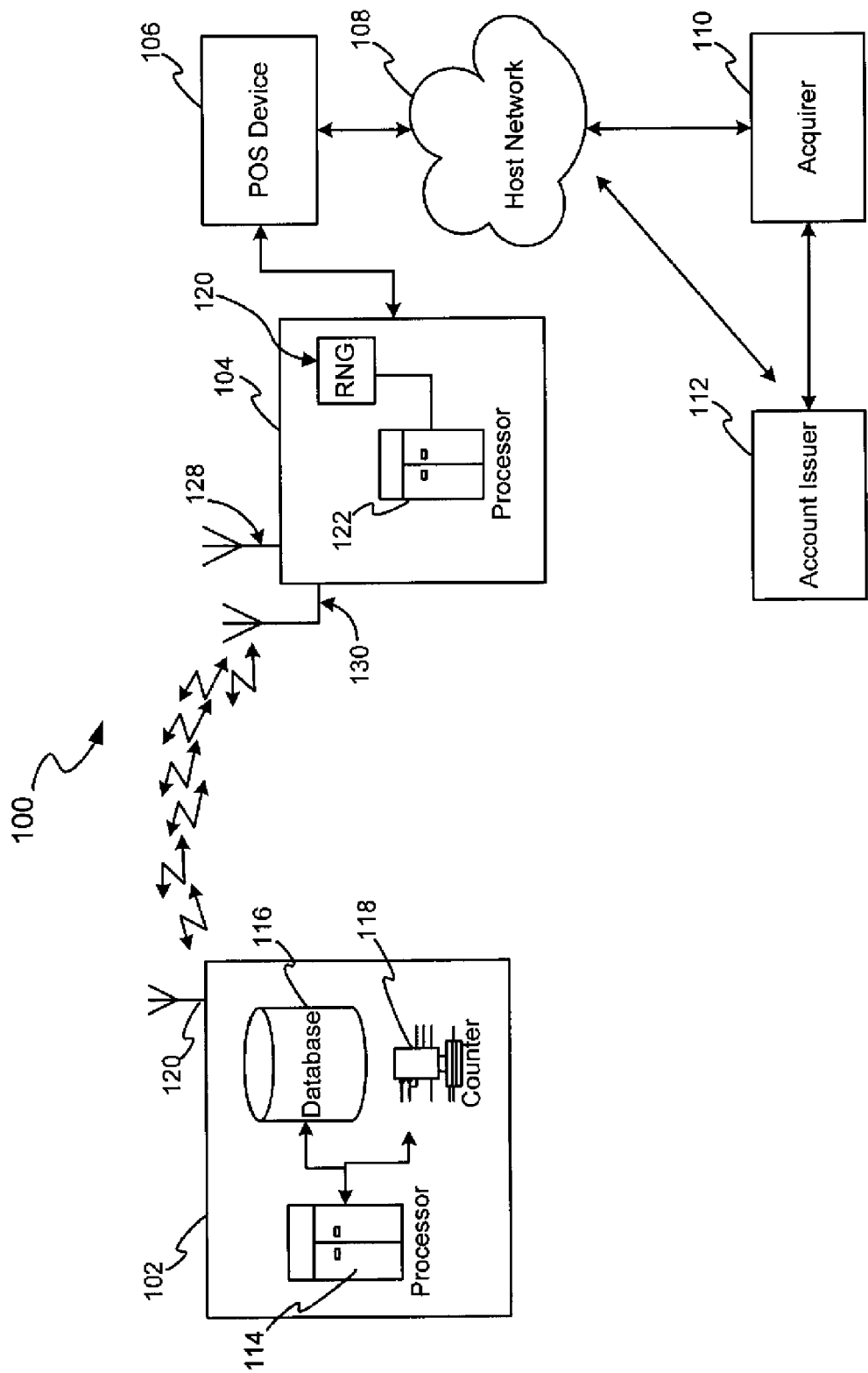
FIG. 1 illustrates an exemplary RFID-based system depicting exemplary components for use in RFID transaction completion in accordance with the present invention.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN).

Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors, (Sybex 1999); Deborah Ray and Eric Ray, "Mastering HTML 4.0" (1997); Loshin, "TCP/IP Clearly Explained" (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, kiosk, personal digital assistant, handheld computer (e.g., Palm Pilot®, Blackberry®), cellular phone and/or the like. Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system, including a POS device and a host network, may reside on a local area network which interfaces to a remote network (not shown) for remote authorization of an intended transaction. The POS may communicate with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or MasterCard, or the like.

To facilitate understanding, the present invention may be described with respect to a credit account. However, it should be noted that the invention is not so limited and other accounts permitting an exchange of goods and services for an account data value is contemplated to be within the scope of the present invention.

A transaction device identifier (e.g., account number) may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. These first five to seven digits may be termed the "routing number" herein. The routing number may typically be included in the account number for use in indicating the transaction completion transmission route corresponding to an account issuer, funding source, or the like. Typically, the routing number may not be used for payment. In this example, the last sixteenth digit is used as a sum check for the sixteen-digit number. The intermediary eight-to-ten digits are used to uniquely identify the customer. The account number is stored as Track 1 and Track 2 data as defined in ISO/IEC 7813, and further may be made unique to the RFID transaction device.

In one exemplary embodiment, the transaction device identifier may include a unique RFID transaction device serial number and user identification number, as well as specific application applets. The transaction device identifier may be stored on a transaction device database located on the transaction device. The transaction device database may be configured to store multiple account numbers issued to the RFID transaction device user by the same or different account providing institutions. In addition, where the device identifier corresponds to a loyalty or rewards account, the RFID transaction device database may be configured to store the attendant loyalty or rewards points data.

In addition to the above, the transaction device identifier may be associated with any secondary form of identification configured to allow the consumer to interact or communicate with a payment system. For example, the transaction device identifier may be associated with, for example, an authorization/access code, personal identification number (PIN), Internet code, digital certificate, biometric data, and/or other secondary identification data used to verify a transaction device user identity.

It should be further noted that conventional components of RFID transaction devices may not be discussed herein for brevity. For instance, one skilled in the art will appreciate that the RFID transaction device and the RFID reader disclosed herein include traditional transponders for transmitting information between the device and the reader, antennas for facilitating RF data transmission, protocol sequence controllers or microprocessors for controlling the operation of the device or reader components, modulators/demodulators and the like for conditioning a RF data transmission to be read by the reader or device, which may be necessary for proper RFID data transmission. As such, those components are contemplated to be included in the scope of the invention.

It should be noted that the transfer of information in accordance with this invention, may be done in a format recognizable by a merchant system or account issuer. In that regard, by way of example, the information may be transmitted from the RFID device to the RFID reader, or from the RFID reader to the merchant system in magnetic stripe or multi-track magnetic stripe format. Because of the proliferation of devices using magnetic stripe format, the standards for coding information in magnetic stripe format were standardized by the International Standards Organization (ISO), which standards are incorporated herein by reference.

Typically, magnetic stripe information is formatted in three tracks. Certain industry information must be maintained on certain portion of the tracks, while other portions of the tracks may have open data fields. The contents of each track and the formatting of the information provided to each track is controlled by ISO standard ISO/IEC 7811. For example, the information must typically be encoded in binary. Track 1 is usually encoded with user information (name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with this invention, it may be provided in magnetic stripe format track. For example, the counter values, authentication tags and encrypted identifiers, described herein, may be forwarded encoded in all or a portion of a data stream representing data encoded in, for example, track 2 or track 3 format.

Further still, various components may be described herein in terms of their "validity." In this context, a "valid" component is one which is authorized for use in completing a transaction request in accordance with the present invention. Contrarily, an "invalid" component is one which is not authorized for transaction completion. In addition, an invalid component may be one which is not recognized as being permitted for use on the secure RF system described herein.

FIG. 1 illustrates an exemplary secure RFID transaction system 100 in accordance with the present invention, wherein exemplary components for use in completing a RF transaction are depicted. In general, system 100 may include a RFID transaction device 102 in RF communication with a RFID reader 104 for transmitting data there between. RFID reader 104 may be in further communication with a merchant point-of-sale (POS) device 106 for providing to POS 106 data received from RFID transaction device 102. POS 106 may be in further communication with an acquirer 110 or an account issuer system 112 via a network 108 for transmitting a transaction request, including information received from RFID reader 104, and receiving authorization concerning transaction completion.

Although point-of-interaction device (POS 106) is described herein with respect to a merchant point-of-sale (POS) device, the invention is not to be so limited. Indeed, a merchant POS device is used herein by way of example, and the point-of-interaction device may be any device capable of receiving transaction device account data. In this regard, the POS may be any point-of-interaction device enabling the user to complete a transaction using transaction device 102. POS device 106 may receive RFID transaction device 102 information and provide the information to host network 108 for processing. In one exemplary embodiment, POS device 106 may receive the transaction device information in ISO/IEC 8583 message format from RFID reader 104.

As used herein, an "acquirer" may be a third-party entity including various databases and processors for facilitating the routing of the transaction request to an appropriate account issuer system 112. Acquirer 112 may route the request to the account issuer in accordance with a routing number provided by RFID transaction device 102. The "routing number" in this context may be a unique network address or any similar device for locating account issuer system 112 on network 108. Traditional means of routing the payment request in accordance with the routing number are well understood. As such, the process for using a routing number to provide the payment request will not be discussed herein for brevity.

Additionally, account issuer system 112 ("account provider") may be any entity which provides a transaction account for facilitating completion of a transaction request. The transaction account may be any credit, debit, loyalty, direct debit, checking, or savings, or the like. The term "issuer" or "account provider" may refer to any entity facilitating payment of a transaction using a transaction device, and which includes systems permitting payment using at least one of a preloaded and non-preloaded transaction device. Typical issuers may be American Express, MasterCard, Visa, Discover, and the like. In the preloaded value processing context, an exchange value (e.g., money, rewards points, barter points, etc.) may be stored in a preloaded value database (not shown) for use in completing a requested transaction. The preloaded value database and thus the exchange value may not be stored on the transaction device itself, but may be stored remotely, such as, for example, at account issuer system 112 location. Further, the preloaded value database may be debited the amount of the transaction requiring the value to be replenished. The preloaded value may be any conventional value (e.g., monetary, rewards points, barter points, etc.) which may be exchanged for goods or services. In that regard, the preloaded value may have any configuration as determined by issuer system 112.

RFID transaction device 102 may include a database 116 for storing transaction device information including the transaction device account number, customer identification, transaction device encryption and security keys, etc. The merchant database locations maintained on database 116 by server 110 are provided a distinct merchant identifier. Database discussed herein may be a graphical, hierarchical, relational, object-oriented or other database. In one embodiment, databases disclosed are a collection of ASCII or other text files. In another embodiment data is stored in a hierarchical file structure conforming to ISO 7816 file structure standards. Database information is suitably retrieved from the database and provided to transaction processing systems upon request via a server application, as described more fully below.

The database 116 may be in communication with a transaction device microprocessor 114 (e.g., protocol sequence controller) for use in controlling the operation of the internal circuits of RFID transaction device 102. The protocol sequence controller 114 may be in communication with a RFID transaction device counter 118. Counter 118 may be useful for tracking the number of transactions completed by a particular device 102, as described below. Microprocessor 114 facilitates the counting of the transactions by facilitating the incrementing of the counter 118 each occurrence of device 102 usage. The RFID device 102 may further include a transponder (not shown) for use in receiving RF data and configuring the data to be readable by the device 102 circuitry.

In general, during operation of secure system 100, RFID reader 104 may provide an interrogation signal to transaction device 102 for powering device 102 and receiving transaction device related data. The interrogation signal may be received at transaction device antenna 120 and may be received at a RFID transaction device transponder (not shown), which provides the interrogation signal to processor 114. In response, transaction device processor 114 may retrieve a transaction device identifier from transaction device database 116 for providing to RFID reader 104 to complete a transaction request. Typically, the transaction device identifier may be encrypted prior to providing the device identifier to RFID reader 104.

It should be noted that RFID reader 104 and RFID transaction device 102 may engage in mutual authentication prior to transferring any transaction device 102 data to RFID reader 104. For a detailed explanation of a suitable mutual authentication process for use with the invention, please refer to commonly owned U.S. patent application Ser. No. 10/340,352, entitled "System and Method for Incenting Payment Using Radio Frequency Identification in Contact and Contactless Transactions," filed Jan. 10, 2003, incorporated by reference in its entirety.

In accordance with one embodiment of the present invention, a RF transaction using a RFID transaction device is secured by limiting the number of transactions which may be performed with a particular transaction device. Once the maximum transactions value is reached, the transaction device may automatically disable itself against further usage. Alternatively, account issuer system 112 may flag the transaction account correlating to the transaction device such that the account issuer system automatically prevents completion of transactions using the transaction device As such, RFID transaction device 102 in accordance with the present invention further includes a counter 118 for recording and reporting the number of transactions performed with a particular transaction device 102. Counter 118 may be any device capable of being initiated with a beginning value and incrementing that value by a predetermined amount when the transaction device is presented for completion of a transaction. Counter 118 may be a discrete electronic device on the transponder, or may be a software or code-based counter as is found in the art.

The initial counter value may be any value from which other similar values may be measured. The value may take any form, such as, alpha, numeric, a formation of symbols, or any combination thereof.

To facilitate understanding, the following description discusses all values to be in numeric units (0, 1, 2, 3 . . . n). Thus, the counter values, the value amount to be incremented, the total transactions counted value, and the maximum transactions value, are all whole numbers.

It should be noted that account issuer system 112 may preset the initial counter value at any initial value as desired. Account issuer system 112 may also predetermine the value amount to be incremented by counter 118 when the transaction device is used to complete a transaction. Further, account issuer system 112 may assign different values to be incremented for each distinct transaction device 102. Further still, account issuer system 112 may determine the maximum transactions value, which may be particular to each individual transaction device 102 issued by account issuer system 112. Where counter 118 value equals a maximum transactions value, the system 100 prevents the usage of the transaction device 102 to complete additional transactions. Account issuer system 112 may prevent the usage of the transaction device 102 where the account issuer flags the transaction account corresponding to the transaction device 102, thereby preventing authorization for using the account to complete transactions. Alternatively, the transaction device 102 may self-disable. For example, counter 118 value may trigger the transaction device processor 114 to provide a signal for preventing the transfer of the transaction device 102 identifier.

For example, account issuer system 112 may preset the initial counter value at 5 units and the counter value to be incremented at 10 units per transaction. Account issuer system 112 may determine that transaction device 102 may be used to complete a total transaction value of 20 transactions. Since counter 118 increments the counter value by the value to be incremented (e.g., 10 units) for each transaction, then for a total of 20 transactions permitted, the maximum transactions value will be 205 units. Once the counter value equals 205 units, then the operation of the transaction device 102 is disabled.

Figure 2:
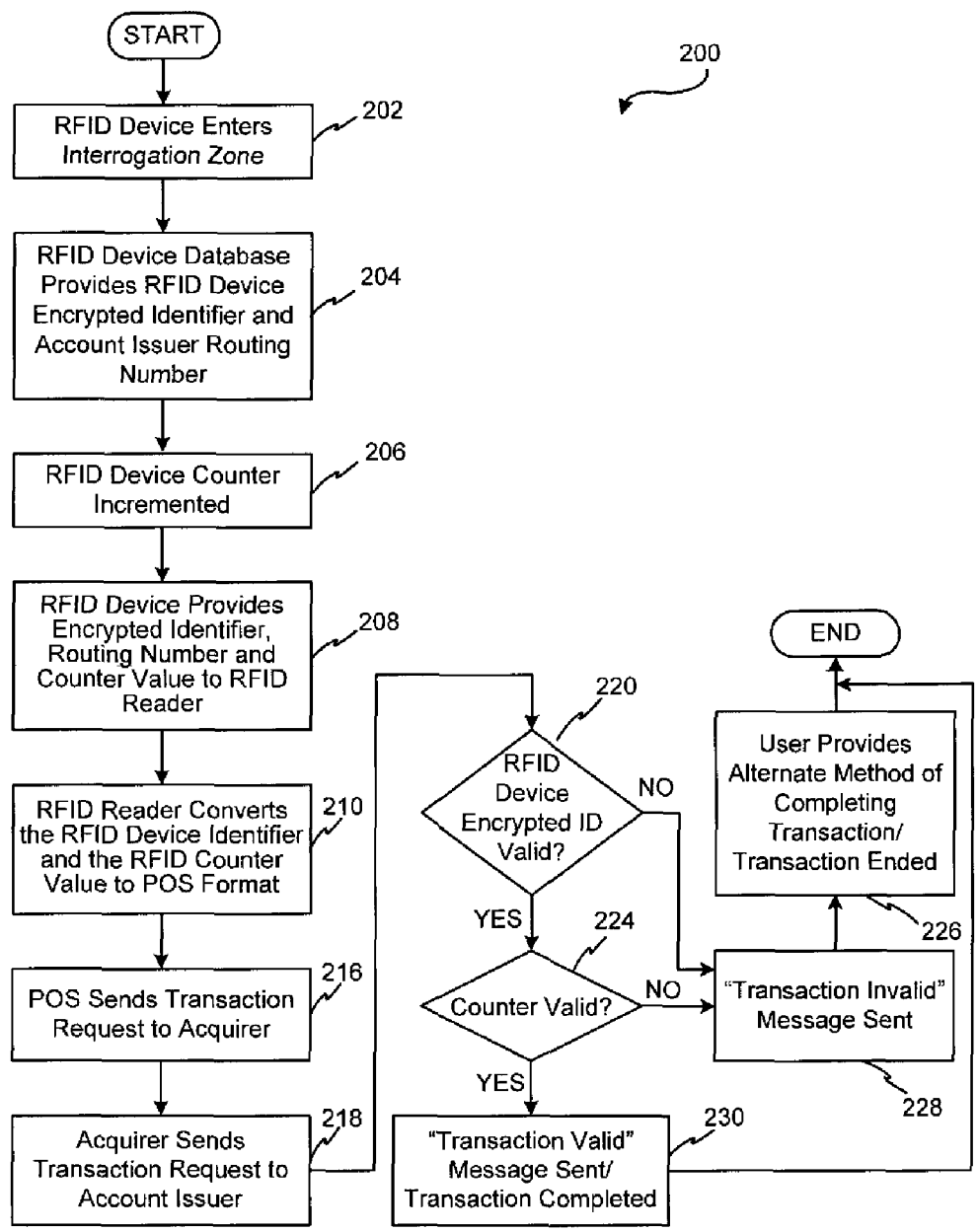
FIG. 2 illustrates an exemplary method for securing a RFID transaction using a counter-generated indicia in accordance with the present invention.

The operation of the exemplary embodiment described above, may be understood with reference to FIG. 1 and to the method of securing a RFID transaction described in FIG. 2. The operation may begin when RFID transaction device 102 is presented for completion of a transaction. Transaction device 102 may be placed in an interrogation field generated by RFID reader 104 (step 202). RFID reader 104 may interrogate RFID transaction device 102 enabling transaction device 102 operation. In response, RFID transaction device 102 may retrieve the transaction device 102 identifier, account issuer system 112 routing number and encrypted transaction device identifier from database 116 for providing to RFID reader 104 (step 204).

Once RFID transaction device 102 detects the interrogation signal provided by RFID reader 104, counter 118 may increment its counter value (step 206). Counter 118 value may be incremented by an amount predetermined by account issuer system 112 (e.g., value amount to be incremented). The resulting counter 118 value after incrementing is the total transactions counted value.

Upon determining the total transactions counted value, RFID transaction device 102 may provide the total transactions counted value, the encrypted transaction device 102 identifier, and account issuer system 112 routing number to RFID reader 104 via RF transmission (step 208). RFID reader 104 may, in turn, convert the transaction device 102 identifier, routing number, and total transactions counted value into merchant POS recognizable format and forward the converted information to merchant POS 106 (step 210). The merchant system including POS 106 may then provide a transaction request to an acquirer 110 via network 106. The transaction request may include the information received from the transaction device 102 along with information (e.g., amount, number of product, product/service identifier) concerning the transaction requested to be completed (step 216). The transaction request may include information relative to RFID reader 104.

Acquirer 110 may receive the transaction request and forward the transaction request to the appropriate account issuer system 112 in accordance with the routing number provided (step 218). The account issuer may then identify that a transaction request is being provided that relates to a transaction device. For example, merchant POS 106 may provide a code appended to the transaction request specially configured for identifying a transaction device transaction which may be recognized by account issuer system 112. Alternatively, the transaction device identifier, or a portion thereof, may be identified by account issuer system 112 as originating with a RFID transaction device 102.

In one exemplary embodiment, account issuer system 112 receives the transaction device 102 identifier and checks to see if the transaction device identifier corresponds to a valid transaction account maintained on account issuer system 112 (step 220). For example, account issuer system 112 may receive the encrypted transaction device identifier and locate the corresponding decryption key relating to the transaction account. If the encrypted ID is invalid, such as, for example, when account issuer system 112 is unable to locate the corresponding decryption key, account issuer system 112 may provide a "Transaction Invalid" message to POS 106 (step 228). Transaction device 102 user may then be permitted to provide an alternate means of satisfying the transaction, or the transaction is ended (step 230).

If the RFID transaction device encrypted identifier corresponding decryption key is located, the encrypted identifier is considered "valid" and account issuer system 112 may then use the corresponding decryption key to "unlock" or locate the transaction device account correlative to the transaction device 102. Account issuer system 112 may then retrieve all information relating to the usage limits which have been predetermined by account issuer system 112. Account issuer system 112 may be able to determine if a particular transaction device 102 has reached its limit of available transactions.

For example, account issuer system 112 may check to see if the total transactions counted value equals or exceeds the maximum transactions allowed (step 224). If the maximum transactions allowed have been reached then the counter value is met or exceeded, and the transaction is considered "invalid." As such, account issuer system 112 may then provide a "Transaction Invalid" message to POS 106 (step 228). In addition, account issuer system 112 may determine whether the total transactions counted value is the next expected value. If not, then the transaction is considered "invalid" and account issuer system 112 may also provide a "Transaction Invalid" message to POS 106 (step 228). Transaction device 102 user may then be permitted to provide alternate means of completing the transaction (step 226) or the transaction is ended.

Alternatively, where the total transactions counted value does not exceed or meet the maximum transactions allowed value, the counter value is considered valid and a "Transaction Valid" message is sent to merchant POS 106 (step 230). The merchant may then complete the transaction under business as usual standards as are employed by the merchant.

In accordance with the various embodiments described, the present invention addresses the problem of securing a RF transaction completed by a RFID transaction device. The invention provides a system and method for an account issuer to determine if a RFID transaction device is a valid device for completing a transaction on a RF transaction system. The account issuer can determine whether the transaction device is valid by verifying the transaction device counter, and encryption identifier. It should be noted, however, that the present invention contemplates various arrangements wherein the RFID reader may also be validated.

Figure 3:
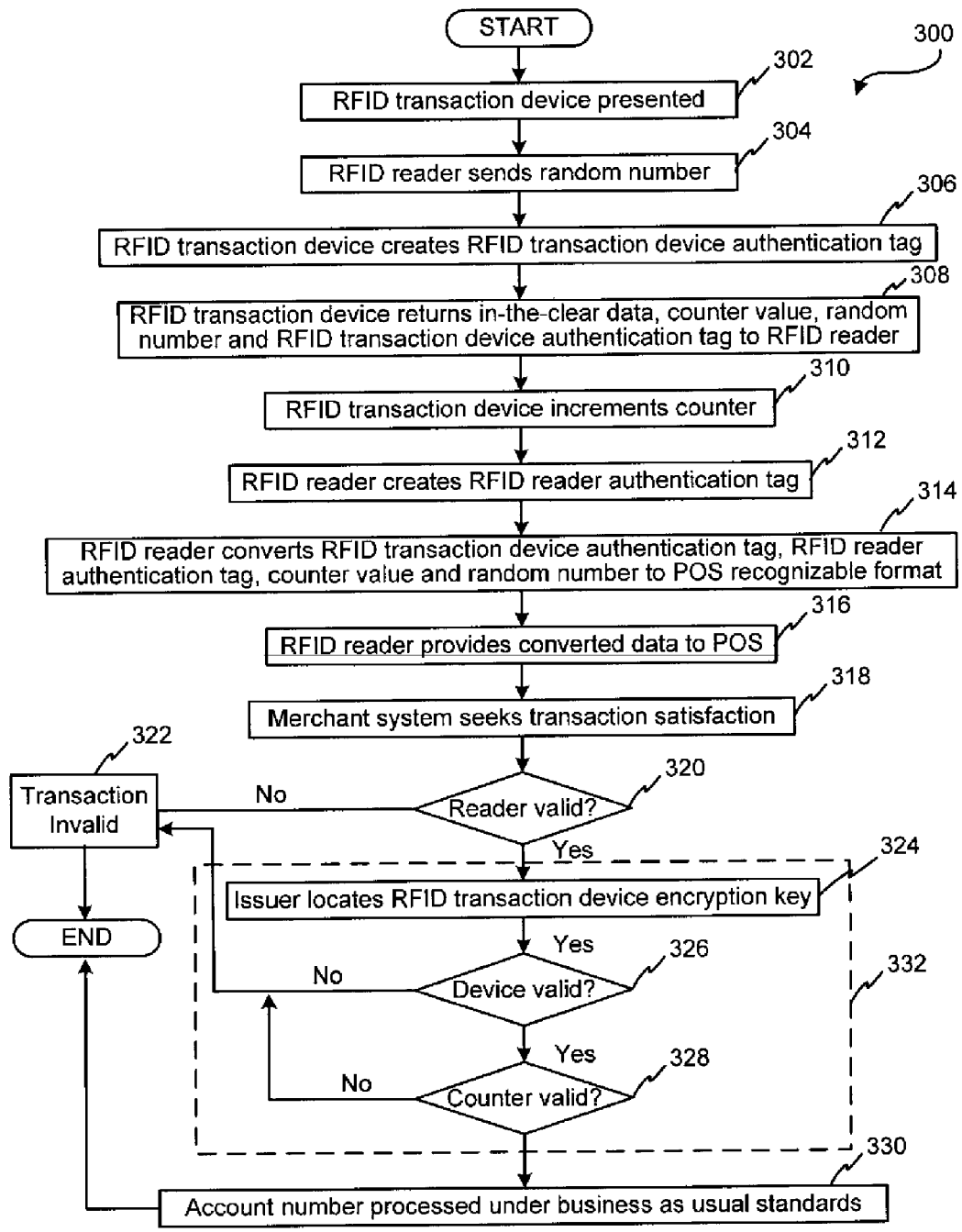
FIG. 3 depicts a flow diagram of an exemplary RFID transaction device and RFID reader authentication flow chart useful with this invention.

FIG. 3 illustrates another method 300 for usage of the RFID transaction device counter 118 value for securing a RF transaction. In accordance with the method depicted, RFID reader 104 includes a random number generator 120, for producing a random number to be used in the secure transactions. Random number generator 120 may be in communication with a RFID reader microprocessor 122, which may provide the generated random number to RFID transaction device 102 during transaction processing. Random number generator 120 may be any conventional random number generator as is found in the art.

Method 300 may begin when a user presents RFID transaction device 102 for transaction completion (step 302). The user may, for example, place RFID transaction device 102 into the interrogation zone provided by a RFID reader 104. The interrogation zone may be the area or zone defined by the interrogation signal cast by RFID reader 104.

Upon presentment of the transaction device 102, RFID reader 104 may provide the random number to RFID transaction device 102. RFID transaction device 102 may receive the random number and use it to create a RFID transaction device authentication tag (step 306). RFID transaction device 102 may receive the random number and use the random number, the counter value, transaction account number and the RFID transaction device encryption key to create a RFID transaction device authentication tag.

RFID transaction device 102 may provide the RFID transaction device authentication tag to RFID reader 104. RFID transaction device 102 may also provide in-the-clear data, the counter value, random number to RFID reader 104, along with the RFID transaction device authentication tag (step 308). RFID transaction device processor 114 may increment counter 118 using any of the incrementing methods discussed above (step 310).

RFID reader 104 may receive the data provided by RFID reader 104, and use the data to create a RFID reader authentication key using a RFID reader encryption key (step 312). RFID reader 104 may convert the in-the-clear data, random number, counter value, RFID transaction device authentication tag, and RFID reader authentication tag into a format readable by POS 106 (step 314) and provide the converted data to POS 106 (step 316).

POS 106 may seek satisfaction of the transaction (step 318). For example, POS 106 may form a transaction request using the data received from RFID transaction device 102, and RFID reader 104 encryption key and forward the transaction request to an acquirer 110 who may forward the transaction request to an account issuer system 112 using the routing number.

Account issuer system 112 may receive the transaction request and verify that RFID reader 104 and RFID transmission device 102 are valid. Account issuer system 112 may validate the RFID reader authentication tag by decrypting the RFID reader authentication tag using a RFID reader encryption key stored on an account issuer database (not shown) (step 320). If the decryption is unsuccessful, then issuer system 112 may provide a "Transaction Invalid" message to POS 106 (step 322) and the transaction is terminated. Alternatively, if decryption is successful, issuer system 112 may seek to validate the RFID transaction device authentication tag (step 332).

For example, account issuer system 112 may use the RF transaction device account number to locate a RFID transaction device encryption key stored on issuer system 112 database (step 324) and use the RFID transaction device encryption key to decrypt the RFID transaction device authentication tag (step 326). If decryption is unsuccessful then issuer system 112 provides a "Transaction Invalid" message to POS 106 (step 322) and the transaction is terminated. Alternatively, if the decryption is successful, then issuer system 112 may validate the counter value (step 328). Issuer system 112 may compare the counter value to an expected counter value. In another exemplary embodiment, issuer system 112 may subject the counter value received from RFID transaction device 102 to an algorithm the results of which are validated against an expected counter value.

If the counter value is unsuccessfully validated, then issuer system 112 may provide a "Transaction Invalid" message to POS 106. Otherwise, issuer system 112 may process the RFID transaction account number under business as usual standards (step 330). In this way, the transaction is secured using a counter, by using the counter to validate a RFID transaction device authentication tag and a RFID reader authentication tag.

Figure 4:
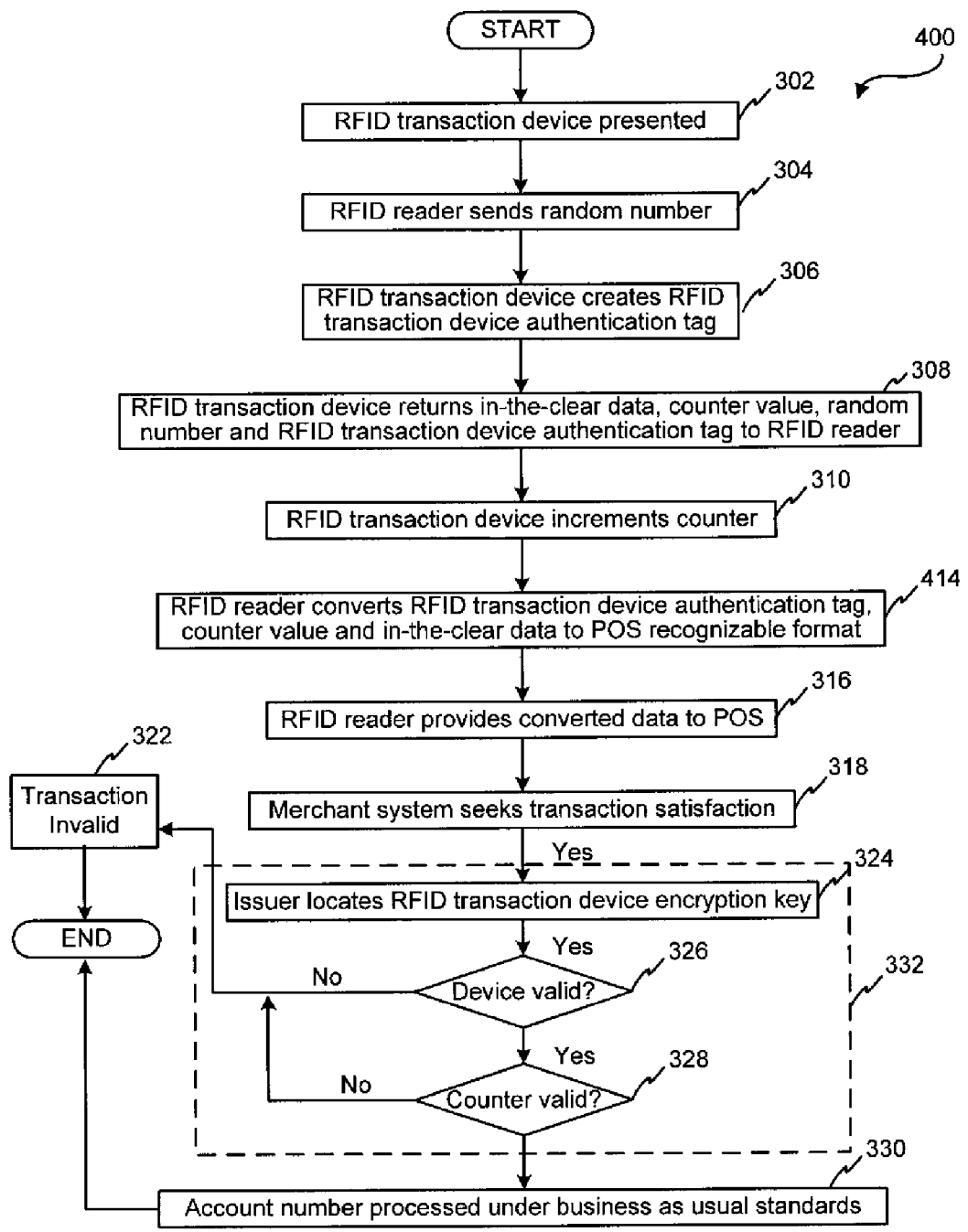
FIG. 4 depicts a flow diagram of an exemplary RFID transaction device authentication flow diagram useful with this invention.

FIG. 4 illustrates another exemplary embodiment of the present invention wherein RFID transaction device 102 is validated using the counter value. In this exemplary embodiment, RFID transaction device 102 is presented (step 302) and RFID reader 104 sends a random number to RFID transaction device 102 (step 304). RFID transaction device 102 receives the random number and creates a RFID transaction device authentication tag using the random number, the in-the-clear data, and a counter value (step 306). RFID transaction device 102 may then provide the RFID transaction device authentication tag, random number, counter value, and in-the-clear data to RFID reader 104 (step 308). RFID transaction device 102 may increment the counter value by a predetermined value (step 310).

RFID reader 104 may receive the RFID transaction device authentication tag, in-the-clear data and counter value and convert the counter value, in-the-clear data and RFID transaction device authentication tag to a merchant POS 106 format (step 414). Merchant POS 106 may then provide the data received from RFID reader 104 to an issuer system 112 (step 316) for transaction satisfaction (step 318). Issuer system 112 may receive the data and verify the RFID transaction device authentication (step 332). For example, issuer system 112 may validate the RFID transaction authentication tag and the counter value in accordance with steps 324-330.

Figure 5:
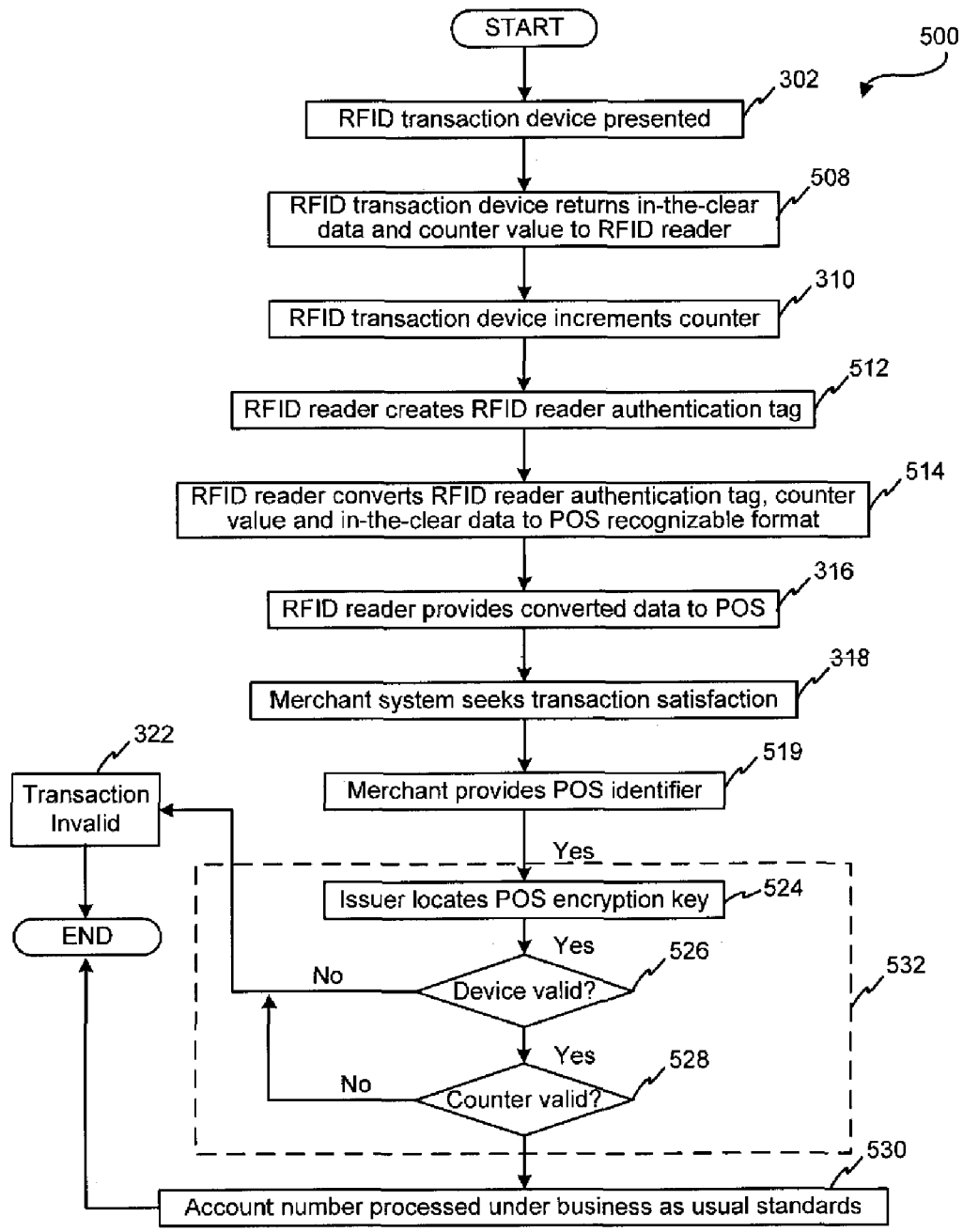
FIG. 5 depicts a flow diagram of an exemplary RFID reader authentication flow diagram useful with this invention.

Under yet another embodiment, FIG. 5 illustrates an aspect of the invention wherein RFID reader 104 is validated, when RFID transaction device 102 is not. According to the invention RFID transaction device 102 is validated using the counter value. In this exemplary embodiment, RFID transaction device 102 is presented for transaction completion as described before (step 302). RFID transaction device 102 may then provide the counter and the in-the-clear data to RFID reader 104 (step 508). RFID transaction device 102 may increment the counter value by a predetermined value (step 310).

RFID reader 104 may receive the in-the-clear data and the counter value and prepare RFID reader authentication tag using a RFID reader encryption key (step 512). RFID reader 104 may then convert the in-the-clear data and RFID reader authentication tag to a merchant POS 106 format (step 514). Merchant POS 106 may then provide the data received from RFID reader 104 to an issuer system 112 for transaction satisfaction (step 318). In one exemplary embodiment, merchant POS 106 may provide issuer system 112 with a POS identifier associated with POS 106. Issuer system 112 may receive the POS identifier, and locate a related POS encryption key stored on an issuer system database (not shown). Issuer system 112 may receive the data and verify the RFID transaction device authentication (step 532). For example, issuer system 112 may validate the RFID transaction authentication tag and the counter value in accordance with steps 524-530, in similar manner as is described with respect to steps 324-330 above.

In yet another exemplary embodiment, the counter value is used in conjunction with a routing number to secure a RFID transaction. RFID transaction device 102 provides the routing number to POS 106 which may use the routing number to authenticate (e.g., validate) RFID transaction device 102 and/or decrypt an encrypted transaction account data. Under this method, and undetected by POS 106, the transaction device account number and expiration date (e.g., payload) is encrypted and placed in the unused field of the message provided by RFID reader 104 to POS 106. Issuer system 112 may receive the routing number and the encrypted transaction account data (e.g., transaction account number and expiration date), and use the routing number to validate the transaction device 102, or account number.

Figure 6:
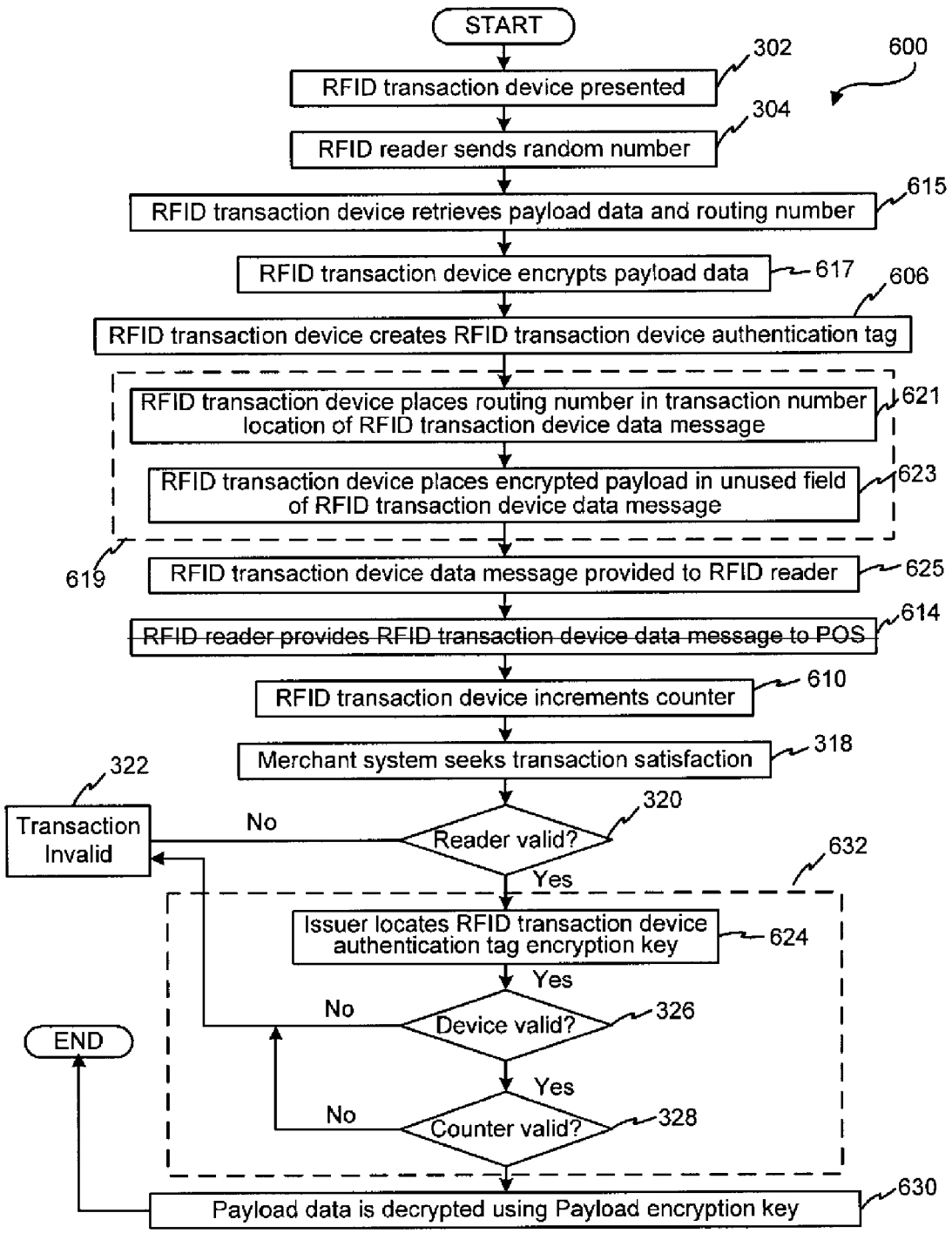
FIG. 6 depicts a flow diagram of an exemplary RFID transaction securing method using a transaction account routing number useful with this invention.

FIG. 6 depicts an exemplary method 600 for using the counter value, routing number and encrypted payload to secure a RFID transaction. RFID transaction device 102 may be presented to a RFID reader 104 for transaction completion (step 302), and RFID reader 104 may send a random number to RFID transaction device 102 (step 304). RFID transaction device 102 may receive the random number and retrieve the transaction account number and expiration date (e.g., payload data) associated with RFID transaction device 102, and the routing number associated with the payload data (step 615). RFID transaction device 102 may encrypt the payload (step 617) and create a RFID transaction device authentication tag using the random number, routing number associated with the transaction account number, the counter value, and encrypted payload data (step 606). RFID transaction device 102 may form a RFID transaction device data message including the RFID transaction device authentication tag, counter value, encrypted payload and routing number (step 619). RFID transaction device 102 may place the routing number in a location typically recognizable by POS 106 as the transaction account number (step 621). In this way, POS 106 is unaware that the data received in the ordinary transaction number field of the data message is a routing number. Additionally, RFID transaction device 102 may place the encrypted payload in the unused field of the RFID transaction device data message (step 623). RFID transaction device 102 may provide the data message to RFID reader 104 in the format discussed above (step 625), and RFID reader 104 may provide the data message to POS 106 in any POS recognizable format (step 614). RFID transaction device 102 may then increment the counter value (step 610). The merchant may then seek transaction satisfaction by forwarding the transaction to issuer system 112, for example (step 318).

RFID transaction device 102 may be validated (step 632) by validating the RFID transaction device authentication tag, counter value or the like. For example, issuer system 112 may seek to validate the RFID transaction device authentication tag. Issuer system 112 may, for example, use the routing number to locate a corresponding RFID transaction device authentication tag decryption key stored on issuer system 112 database and use the RFID transaction device decryption key to decrypt the RFID transaction device authentication tag (step 624). If decryption is unsuccessful (step 326) then issuer system 112 provides a "Transaction Invalid" message to POS 106 (step 322) and the transaction is terminated. Alternatively, if the decryption is successful (step 326), then issuer system 112 may validate the counter value (step 328). Issuer system 112 may compare the counter value to an expected counter value. In another exemplary embodiment, issuer system 112 may subject the counter value received from RFID transaction device 102 to an algorithm the results of which are validated against an expected counter value.

If the counter value is unsuccessfully validated, then issuer system 112 may provide a "Transaction Invalid" message to POS 106 (step 322). Otherwise, issuer system 112 may process the RFID transaction account number under business as usual standards. In an alternate embodiment, upon validating the counter value and the RFID transaction device authentication tag, issuer system 112 may use the routing number to locate a decryption key for decrypting the encrypted payload (e.g., "payload encryption key") and decrypt the payload accordingly (step 630). Alternatively, the payload encryption key and the RFID authentication tag encryption key may be identical, substantially the same key, or different keys entirely.

Notably, since the routing number may be defined as the card number in the data transmitted from the RFID reader 104 to POS 106, the issuing system 112 may readily use the routing number to locate appropriate decryption keys. In this way, the transaction is secured using a counter, by using the counter to validate a RFID transaction device authentication tag and a RFID reader authentication tag.

Figure 7:
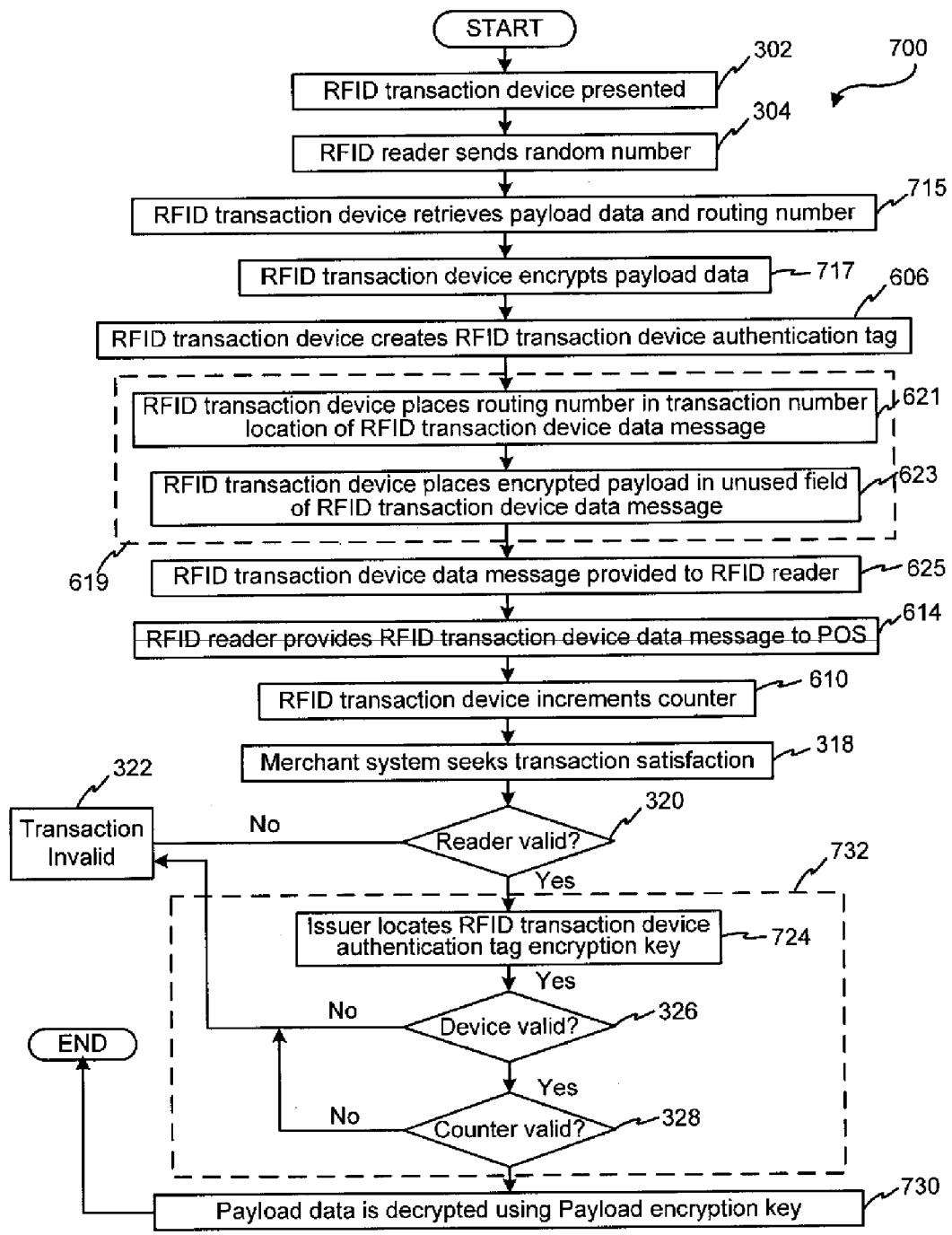
FIG. 7 depicts a flow diagram of an exemplary RFID transaction securing method using a transaction account routing number and customer identifying information useful with this invention.

FIG. 7 depicts yet another method 700 for securing a RF transaction wherein the customer identifying information (called "customer data" herein) is encrypted and provided in the data transmission field, and in one embodiment, in the portion of the data transmission field typically reserved for unused information. In a similar manner as is described with respect to FIG. 6, the routing number associated with a particular transaction account is placed in the data transmission field typically reserved for the transaction account number. Merchant POS 106 may be unaware of the content of the information stored in the transaction account and unused fields, such that the merchant system processes the transaction request as if the fields contained the information typically stored therein.

Operation of method 700 may be understood with reference to FIG. 7 and continued reference to FIGS. 1 and 6. Namely, method 700 may begin with RFID transaction device 102 being presented to a RFID reader 104 for transaction completion (step 302), and RFID reader 104 may send a random number to RFID transaction device 102 (step 304). RFID transaction device 104 may receive the random number and retrieve the transaction account number, expiration date (e.g., payload data), the customer identifying information (e.g., customer name) associated with RFID transaction device 102, and the routing number associated with the payload data (step 715). In this exemplary embodiment, the "payload data" is described as including the customer identification information. RFID transaction device 102 may encrypt the payload data (step 717) and create a RFID transaction device authentication tag using the random number, routing number associated with the transaction account number, the counter value, and encrypted payload data (step 606). RFID transaction device 102 may form a RFID transaction device data message including the RFID transaction device authentication tag, counter value, encrypted payload and routing number (step 619). RFID transaction device 102 may place the routing number in a location typically recognizable by POS 106 as the transaction account number (step 621). In this way, POS 106 may be unaware that the data received in the ordinary transaction number field of the data message is a routing number. Additionally, RFID transaction device 102 may place the encrypted payload in the unused field of the RFID transaction device data message (step 623). RFID transaction device 102 may provide the data message to RFID reader 104 in the format discussed above (step 625), and RFID reader 104 may provide the data message to POS 106 in any POS recognizable format (step 614). RFID transaction device 102 may then increment the counter value (step 610). The merchant may then seek transaction satisfaction by forwarding the transaction to issuer system 112, for example (step 318).

RFID transaction device 102 may be validated (step 732) by validating the RFID transaction device authentication tag, counter value or the like. For example, issuer system 112 may seek to validate the RFID transaction device authentication tag. Issuer system 112 may, for example, use the routing number to locate a corresponding RFID transaction device authentication tag decryption key stored on issuer system 112 database and use the RFID transaction device decryption key to decrypt the RFID transaction device authentication tag (step 724). If decryption is unsuccessful (step 326), then issuer system 112 provides a "Transaction Invalid" message to POS 106 (step 322) and the transaction is terminated. Alternatively, if the decryption is successful (step 326), then issuer system 112 may validate the counter value (step 328). Issuer system 112 may compare the counter value to an expected counter value. In another exemplary embodiment, issuer system 112 may subject the counter value received from RFID transaction device 102 to an algorithm the results of which are validated against an expected counter value.

If the counter value is unsuccessfully validated, then issuer system 112 may provide a "Transaction Invalid" message to POS 106 (step 322). Otherwise, issuer system 112 may send a "Transaction Valid" message to the merchant system and process the RFID transaction account number under business as usual standards. In an alternate embodiment, upon validating the counter value and the RFID transaction device authentication tag, issuer system 112 may locate a decryption key for use in decrypting the payload. For example, the issuer system 112 may use the routing number to locate a payload decryption key for decrypting the encrypted payload (e.g., "payload encryption key") and decrypt the payload accordingly (step 630). Alternatively, the payload encryption key and the RFID authentication tag encryption key may be identical, substantially the same key, or different keys entirely.

Upon locating the appropriate decryption key, and successfully decrypting the transaction account authentication tag, issuer system 112 may retrieve the customer identifying information from the payload, and provide the customer identifying information to the merchant with the "Transaction valid" message (step 730). The customer identifying information may be provided to the merchant in an unencrypted format or in an encrypted format decrypt-able by the merchant system. The merchant may then use the customer identifying information to fulfill its billing and recordkeeping purposes.

As previously noted, since the routing number may be defined as the card number in the data transmitted from the RFID reader 104 to POS 106, the issuing system 112 may readily use the routing number to locate appropriate decryption keys (step 624). In this way, the transaction is secured by placing the customer identifying information in the unused field of the RF data transmission.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the RFID reader may include an RFID reader encrypted identifier stored in the reader database, which may be validated by the account issuer in similar manner as with the transaction device encrypted identifier. Moreover, the counter may increment the total transactions counted value by the predetermined incremental value at the completion of a successful transaction. In addition, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. A method, comprising:
    creating an encrypted authentication tag using a random number and at least one of a transaction account code, a routing number, or a counter value; and
    transmitting the encrypted authentication tag and the routing number to a radio frequency identification (RFID) reader using a data transmission format comprising an account code field and an unallocated field,
    wherein the encrypted authentication tag is transmitted in the unallocated field of the data transmission format.

2. The method of claim 1, further comprising receiving the random number from the RFID reader.

3. The method of claim 2, further comprising transmitting an RFID reader authentication code to the RFID reader and receiving an encrypted RFID reader authentication code from the RFID reader.

4. The method of claim 3, further comprising verifying the encrypted RFID reader authentication code for authentication of the RFID reader.

5. The method of claim 1, wherein the encrypted authentication tag is created using the routing number.

6. The method of claim 1, further comprising incrementing the counter value by at least one of a random amount or a predetermined amount.

7. The method of claim 1, wherein the routing number is transmitted in a transaction account field.

8. The method of claim 7, wherein the transaction account field is a primary account number (PAN) field as defined by ISO 8583.

9. The method of claim 7, further comprising:
    creating a payload data file by encrypting the transaction account code; and
    transmitting the payload data file to the RFID reader in at least one of character positions 64-79 of a Track 1 format as defined in ISO 7813.

10. The method of claim 1, wherein the unallocated field includes at least one of character positions 64-79 of a Track 1 format as defined in ISO 7813.

11. The method of claim 1, wherein the unallocated field includes at least one of: a field separator (FS) field, an expiry date (ED) field, a service code (SC) field, a PIN verification value (PVV) field, a discretionary data (DD) field, an end sentinel (ES) field, or a longitude redundancy check (LRC) field, of a Track 1 format as defined in ISO 7813.

12. A radio frequency transaction device, comprising:
    a processor configured to create an encrypted authentication tag and a routing number, wherein the processor is configured to create the encrypted authentication tag using at least one of a counter value, the routing number, or a transaction account code; and
    a communication device configured to transmit the encrypted authentication tag using a data transmission format comprising an account code field and an unallocated field, wherein the encrypted authentication tag is configured to be transmitted in the unallocated field of the data transmission format.

13. The radio frequency transaction device of claim 12, further comprising a memory configured to store customer identifying information, the counter value, the transaction account code, and an encryption key.

14. The radio frequency transaction device of claim 13, wherein the processor is configured to create the encrypted authentication tag using at least one of the customer identifying information, the encryption key, the counter value, the routing number, or the transaction account code.

15. The radio frequency transaction device of claim 12, further comprising a memory configured to store a payload data file.

16. The radio frequency transaction device of claim 15, wherein the payload data file comprises an encrypted transaction account code.

17. A method, comprising:
    receiving an encrypted account payload data file from a radio frequency (RF) transaction device using a data transmission format comprising an account code field and an unallocated field, wherein the encrypted account payload data file is transmitted in the unallocated field of the data transmission format;
    receiving a routing number from the RF transaction device in a transaction account field, wherein the transaction account field does not contain a transaction account code; and
    using the routing number to transmit the encrypted account payload data file to an account provider.

18. The method of claim 17, further comprising:
    providing a random number to the RF transaction device; and
    receiving an encrypted authentication tag from the RF transaction device, wherein the encrypted authentication tag is generated using the random number and at least one of the transaction account code, the routing number, or a counter value.

19. The method of claim 18, further comprising converting at least one of the encrypted authentication tag, the counter value, the random number, or the routing number into a merchant point of sale (POS) recognized format.

20. The method of claim 19, wherein the merchant POS recognized format is ISO/IEC 8583 compatible.

21. The method of claim 18, further comprising verifying the encrypted authentication tag using an authentication tag decryption key corresponding to an identification code received from the RF transaction device.

22. The method of claim 17, further comprising decrypting the encrypted account payload data file using a payload decryption key corresponding to an identification code received from the RF transaction device.

23. The method of claim 17, wherein the transaction account field is a primary account number (PAN) field as defined by ISO 8583.

24. The method of claim 17, wherein transmitting the encrypted account payload data file to an account provider is performed without having access to the transaction account code.

25. A method, comprising:
- associating radio frequency (RF) transaction device data with a routing number;
- receiving an encrypted authentication tag from a merchant in accordance with the routing number using a data transmission format comprising an account code field and an unallocated field, wherein the encrypted authentication tag is transmitted in the unallocated field of the data transmission format;
- verifying the encrypted authentication tag using an authentication tag decryption key corresponding to the RF transaction device data; and
- decrypting the encrypted authentication tag to process a transaction request.

26. The method of claim 25, wherein the authentication tag decryption key relates to the routing number.

27. The method of claim 25, further comprising:
- decrypting the encrypted authentication tag to read a counter value; and
- verifying the counter value to facilitate processing the transaction request.

28. The method of claim 27, further comprising receiving a payload data file from the merchant in accordance with the routing number.

29. A method, comprising:
- associating radio frequency (RF) transaction device data with a routing number;
- receiving an encrypted authentication tag and a payload data file from a merchant in accordance with the routing number;
- verifying the encrypted authentication tag using an authentication tag decryption key corresponding to the RF transaction device data; and
- decrypting the encrypted authentication tag to process a transaction request and to read a counter value; and
- verifying the counter value to facilitate processing the transaction request, wherein processing the transaction request comprises at least one of:
- locating a payload decryption key using the routing number;
- decrypting customer identifying information from the payload data file using the payload decryption key to create decrypted customer identifying information; or
- providing the decrypted customer identifying information to a merchant point of sale (POS) device for processing.

* * * * *